United States Patent [19]

Kaneko

[11] Patent Number: 4,765,261
[45] Date of Patent: Aug. 23, 1988

[54] FLUID INJECTION CULTIVATOR

[75] Inventor: Takuji Kaneko, Numazu, Japan

[73] Assignee: Fuji Robin Kabushiki Kaisha, Tokyo, Japan

[21] Appl. No.: 53,599

[22] Filed: May 20, 1987

[30] Foreign Application Priority Data

Nov. 15, 1984 [JP] Japan .................................. 59-242124
Feb. 27, 1985 [JP] Japan .................................. 60-38499
Feb. 28, 1985 [JP] Japan .................................. 60-39210

[51] Int. Cl.$^4$ ............................................. A01C 23/00
[52] U.S. Cl. ..................................................... 111/7
[58] Field of Search ................ 111/6.7, 7.1–7.4, 111/52, 86; 37/1, 193; 299/81, 94; 405/263, 264, 269

[56] References Cited

U.S. PATENT DOCUMENTS

| | | | |
|---|---|---|---|
| 2,168,099 | 8/1939 | Hawkins | 111/7 |
| 2,306,165 | 12/1942 | Irish | 111/7.1 |
| 3,791,322 | 2/1974 | van der Lely et al. | 111/7 |
| 3,924,897 | 12/1975 | Colburn et al. | 111/6 |
| 3,967,564 | 7/1976 | Emling | 111/7 |
| 4,566,543 | 1/1986 | Kotani | 111/6 |
| 4,570,553 | 2/1986 | Ito | 111/6 |

FOREIGN PATENT DOCUMENTS

| | | | |
|---|---|---|---|
| 529864 | 7/1954 | Belgium | 111/7 |
| 1463474 | 12/1966 | France | 111/7 |
| 7400416 | 7/1975 | Netherlands | 111/7 |
| 745414 | 7/1980 | U.S.S.R. | 111/86 |
| 753380 | 8/1980 | U.S.S.R. | 111/6 |

*Primary Examiner*—James R. Feyrer
*Attorney, Agent, or Firm*—Martin A. Farber

[57] ABSTRACT

A frame having a wheel for supporting the frame at a predetermined height has a blade which is downwardly projected from the frame and has an edge at the forward side thereof. An injector is provided at a lower portion of the blade. The frame is moved by a tractor, cutting the soil. Compressed air is injected from the injector into the soil for loosening the soil. Orifices for air injection are located at a narrowed neck of the injector for protection from soil clogging and escape of compressed air.

14 Claims, 10 Drawing Sheets

FLUID INJECTION CULTIVATOR

RELATED APPLICATION

This a continuation-in-part of my co-pending patent application Ser. No. 796,476 filed Nov. 8, 1985, now abandoned.

BACKGROUND OF THE INVENTION

The present invention relates to a cultivator having a blade which cultivates the soil with air injected from a nozzle or injector provided on a lower portion of the blade which is forced into the soil and moved by a tractor.

An aerating device having a vertical injector pipe which is inserted into the soil and injects compressed air into the soil for aerating and loosening the soil is known. The injector pipe is carried by an operator and inserted into the soil at proper intervals. Accordingly, it is difficult to continuously loosen the soil in a wide field.

SUMMARY OF THE INVENTION

The object of the present invention is to provide a cultivator which can continuously cut the soil by a blade and loosen the soil by injecting compressed air into the soil.

According to the present invention, there is provided a cultivator comprising a frame having a wheel for supporting the frame at a predetermined height, first means for connecting the frame to a tractor, at least one blade secured to the frame. The blade is downwardly projected from the frame and has an edge at the forward side thereof. An injector having at least one opening is provided at a lower portion of the blade. Compressed air is supplied to the injector for injecting the compressed air into the soil.

In an aspect of the present invention, the injector has at least two openings provided for injecting the compressed air in lateral and upward directions. All openings for expulsion of compressed air are located in a narrowed neck region of the injector for protection from clogging by soil and for development of soil pressure aft of the neck region to prevent escape of compressed air.

The other objects and features of this invention will become understood from the following description with reference to the accompanying drawings.

DETAILED DESCRIPTION OF THE PREFERRED EMBODIMENTS

Figure 1:
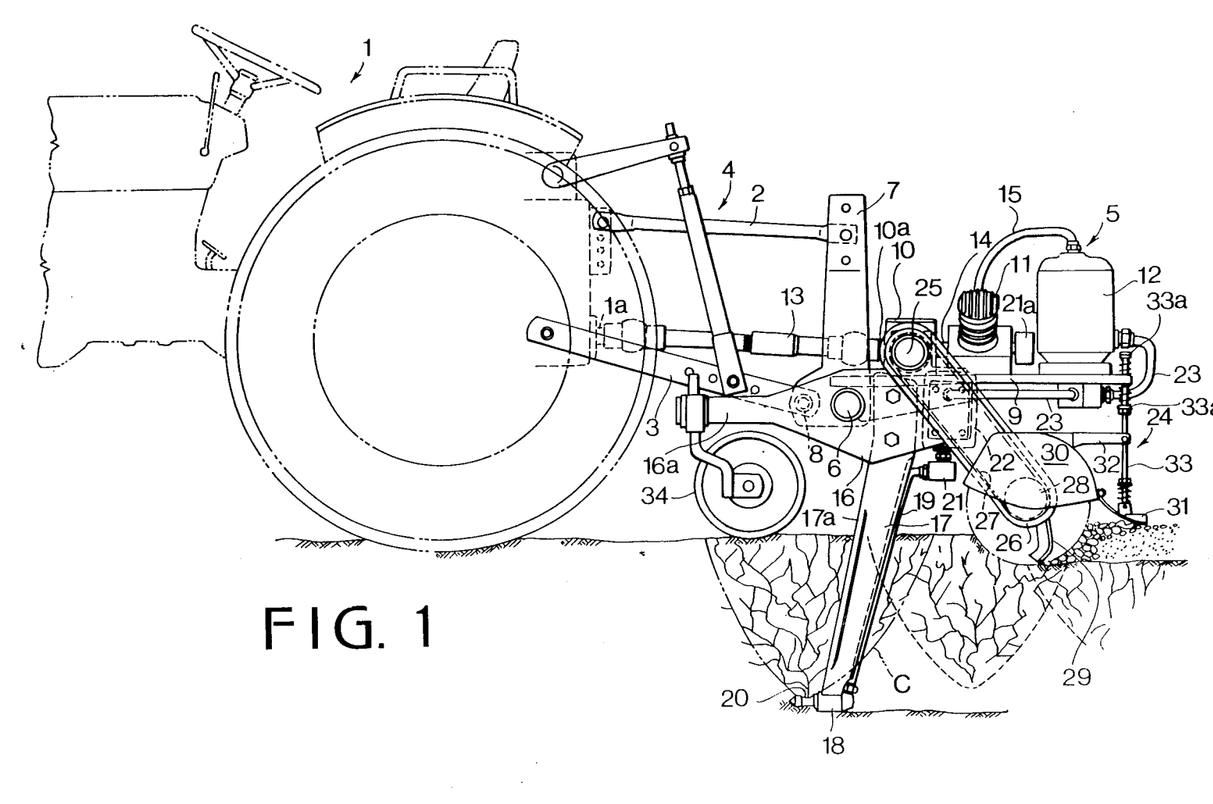
FIG. 1 is a side elevational view of a cultivator as a first embodiment according to the present invention.
Figure 2:
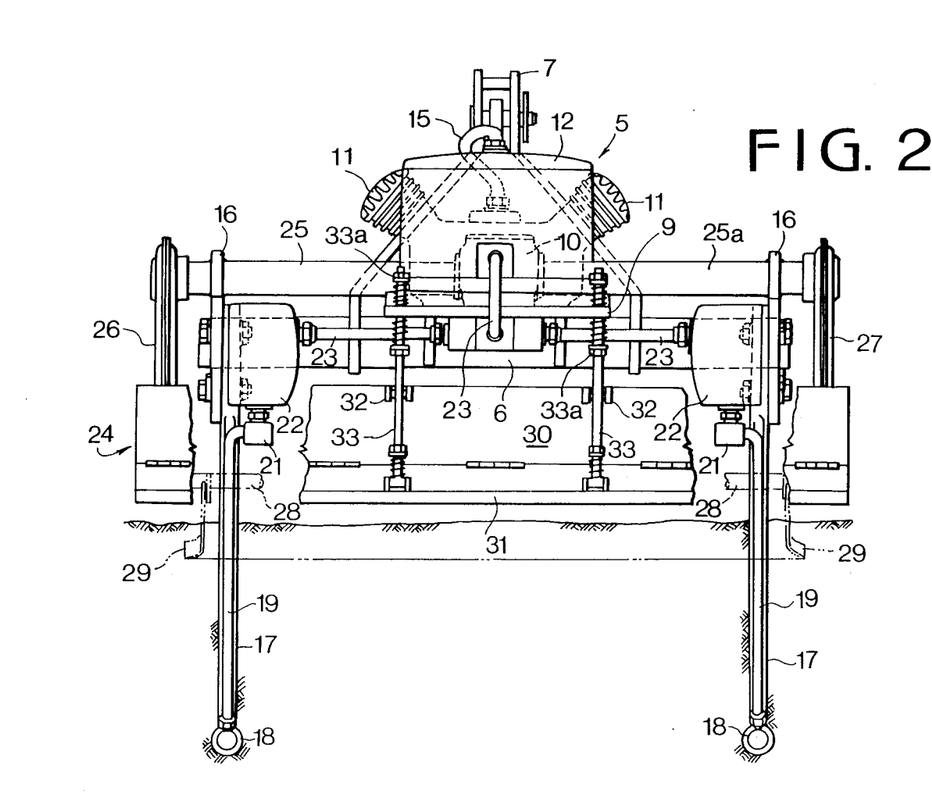
FIG. 2 is an elevation as viewed from the rear of the cultivator of FIG. 1.
Figure 3:
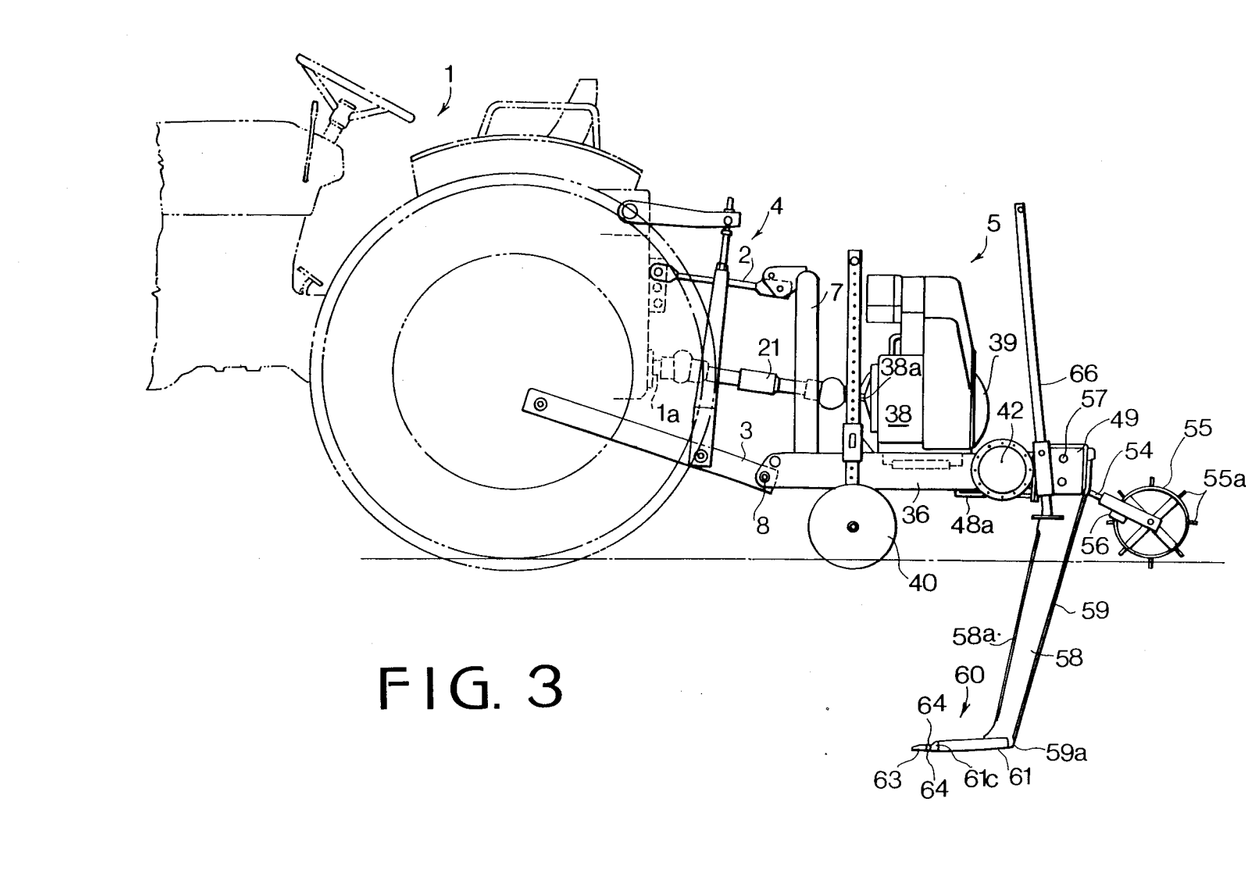
FIG. 3 is a side elevational view of a second embodiment according to the present invention.

Referring to FIGS. 1 and 2, a tractor 1 is provided with a three-point (hitch) linkage 4 comprising a top link 2 and a pair of lower links 3. The linkage 4 is connected to a cultivator 5.

The cultivator 5 has a frame which comprises a lateral pipe 6 and a pair of side plates 16 secured to the pipes 6.

A topmast 7 is secured to the pipe 6, and a base 9 is secured to the pipe 6 and extends to the rear of the frame. The topmast 7 is connected to the top link 2 at an upper portion and to the lower links 3 at the lower end by a lower link pins 8. Each of side plates 16 has an arm 16a extending forward and a gauge wheel 34 is provided at the end of the arm. A gearbox 10, a compressor 11 and a main tank 12 are mounted on the base 9. The tractor is also provided with a power take-off shaft 1a so as to transmit the power to an input shaft 10a of the gearbox 10 through a transmission system 13 comprising universal joints and a propeller shaft. A transmission shaft 14 projecting from the gearbox 10 is provided to drive the compressor 11. A pair of pipes 25 and 25a are secured to both sides of the gearbox and the side plates 16 to form a part of the frame of the machine.

A blade 17 having an edge 17a at a front portion thereof is secured to each side plate 16, extending downwardly. The blade 17 is constructed to slightly incline toward the front. An injector 18 is secured to the lower end of each blade and an air-supply pipe 19 which communicates with the injector is fixed to the back of the blade 17. The injector 18 comprises an arrow-shaped head portion, and a narrow neck portion having a nozzle 20 formed in an upper portion of the neck portion so as to upwardly inject air.

The air compressed by the compressor 11 flows through a pipe 15, is stored in the main tank 12 and is further supplied to a sub-tank 22 through a pipe 23. A solenoid operated valve 21 is provided between the sub-tank 23 and the pipe 19 on the blade 17. A switch box 21a for controlling the valve 21 having a switching device (not shown) is provided behind the compressor 11. Pressure gauges and safety valves or an unloader (not shown) for controlling the pressure in the compressor 11 and the main tank 12 are provided. The compressor 11 and the main tank 12 may be provided closer to the tractor 1.

A rotary cultivating device 24 is disposed behind the blade 17. The cultivating device 24 comprises a pair of hollow arms 26 and 27 rotatably mounted on pipes 25 and 25a, and a rotary shaft 28 is provided with a plurality of radially disposed tines 29, the shaft 28 being rotatably supported on the arms 26, 27 at lower portions thereof respectively. The output of the gearbox 10 is transmitted to the rotary shaft 28 through a shaft in the pipe 25 and a chain mechanism in the arm 26. The rotary cultivating device is covered by a shield cover 30 rotatably provided with an apron 31. A pair of depth adjusting rods 33 are slidably engaged with holes formed in the base 9 and pivotally connected to a pair of holding arms 32 projecting from the shield cover 30. The lower end of each rod 33 is pivotally connected to the apron 31. Adjusting screws 33a and springs 33b are engaged with rods 33 so as to adjust the depth of the cultivation by the rotary cultivating device.

The gauge wheel 34 is also provided to adjust the cultivation depth by the blades 17 and the injectors 18.

The operation of the machine will be described hereinafter. The cultivator 5 is connected to the tractor 1 by a three-point linkage 4 and the power of the tractor is transmitted to the input shaft 10a of the gearbox 10 through the power take-off shaft 1a and a transmission system 13 so as to drive the compressor 11 and the rotary cultivating device 24. The blades 17 and the injectors 18 plunge into the soil to a predetermined depth. The edges 17a cut away the soil to the right and left of the device and the injector advances through the soil while being tracted. The tines 29 rotate to cultivate the soil.

The switch device in switch box 21a operates to control the opening and closing timing of the solenoid operated valve 21. When the solenoid operated valve 21 is opened, the compressed air in the sub-tank 22 is injected into the soil.

As shown in FIG. 1, the air is intermittently injected in accordance with the predetermined timing so that cracks are opened up in areas C, and the soil is aerated and loosened.

After the soil is loosened, an upper part of the loosened soil is consecutively cultivated by the rotary cultivating device 24. Since the soil is cracked and loosened by the compressed air, power for driving the rotary cultivating device can be reduced.

Although, in the above-described embodiment, compressed air is injected simultaneously from openings 20 of the blades 17, the air may alternately be injected. Additionally, the pipe 6 may be employed as a sub-tank.

Figure 4:
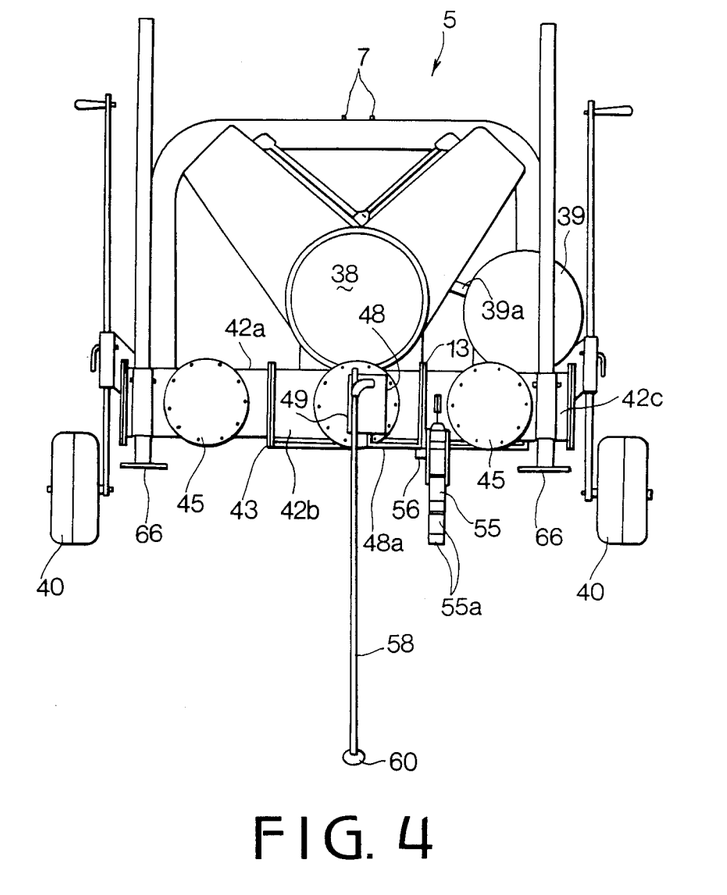
FIG. 4 is an elevation as viewed from the rear of the cultivator of FIG. 3.
Figure 5:
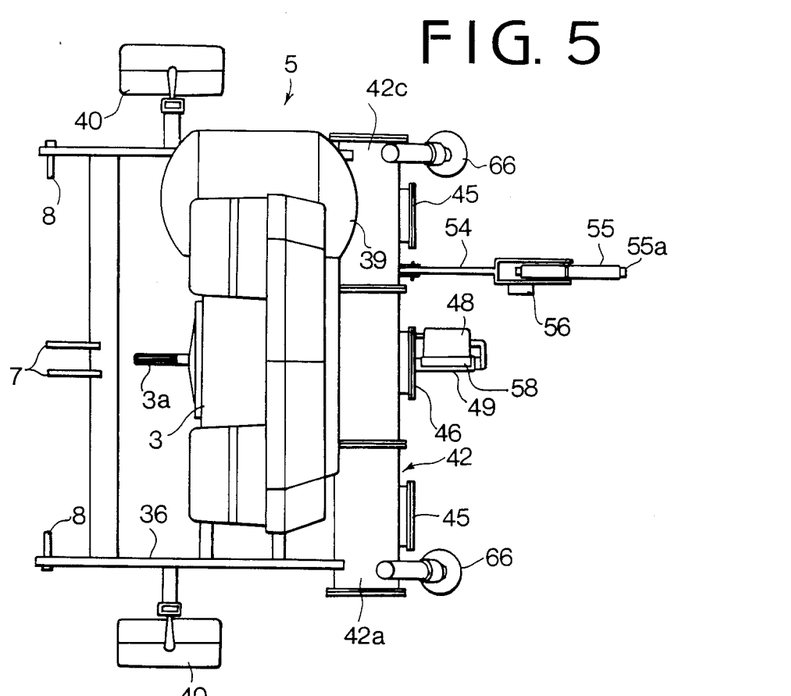
FIG. 5 is plan view of the machine.
Figure 6:
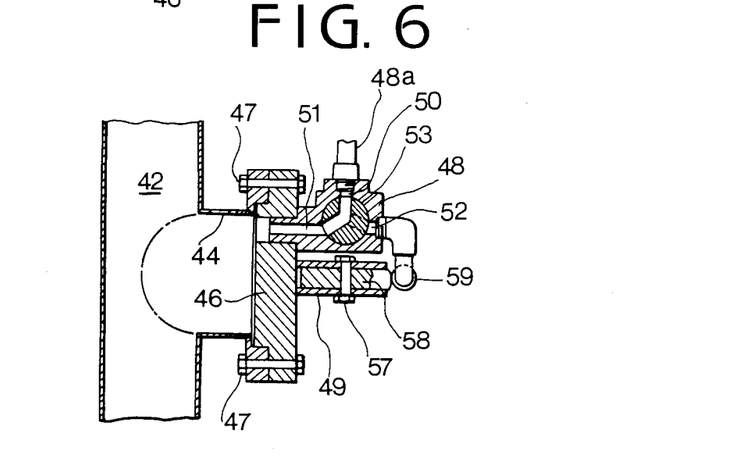
FIG. 6 is an enlarged plan view showing a part of the machine.

FIGS. 3 to 15 show another embodiment of the present invention. The same numerals as those in FIGS. 1 and 2 designate the same parts. Mounted on a frame 36 is a compressor 38, an input shaft 38a of which is connected to a propeller shaft 41 so as to transmit the power from power take-off shaft 1a of the tractor 1. The compressor 38, is communicated with a main tank 39 by a pipe 39a. A pair of depth adjusting wheels 40 are provided at both sides of the frame 36. Secured to the rear end of the frame 36 is a sub-tank 42 comprising three tanks 42a, 42b and 42c which also serves as a lateral frame member. An opening 44 (FIG. 6) formed on the rear side of each sub-tank 42 is closed by a cap 45 when not in use. As shown in FIG. 4, a connector 46 is secured to the opening 44 by bolts 47 when the utilized. A solenoid operated valve 48 provided with three ports and a supporting plate 49 are attached to the connector 46.

The solenoid operated valve 48 has a first port 50 communicated with the main tank 39 through a pipe 48a, a second port 51 communicated with one of the sub-tanks 42, and a third port 52 communicated with an air-supply pipe 59 of a blade 58, and a valve body 53 for selecting one of the ports. Rotatably mounted on the periphery of the sub-tank 42c is a swing arm 54 which is provided with a gauge wheel 55. The gauge wheel 55 has a plurality of lugs 55a at certain intervals and a projection at one side thereof for actuating a microswitch 56 mounted on the arm 54. The valve 53 is rotated by exciting a solenoid (not shown) to communicate one of the sub-tanks 42 with the air-supply pipe 59 at the on-state of the switch 56 and with the main tank 39 at the off-state through a pipe 48a.

The blade 58 is fixed to the supporting plate 49 by bolts 57. The blade has an edge 58a formed on the front edge and is provided with an air-supply pipe 59 at the rear side and an injector 60 at the low end.

Referring to FIGS. 7 to 13, the injector 60 comprises a base portion 61 fixed to the blade 58, a neck portion 62 formed at the front of the base portion 61, a bullet-shaped tip portion 63 formed on the front end of the neck portion 62, and openings 64 formed in the neck portion 62.

Figures 7, 8:
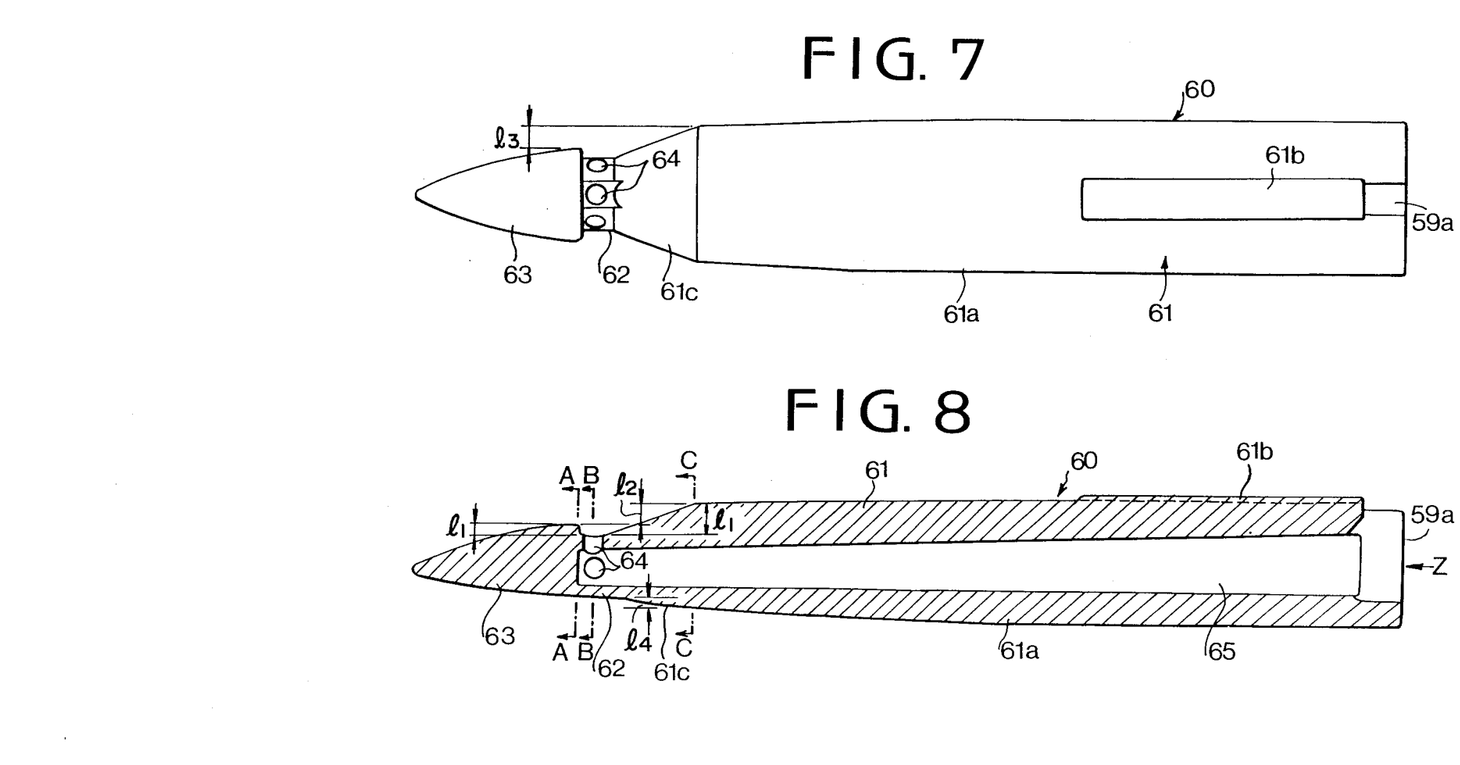
FIG. 7 is a plan view showing an injector in the second embodiment.
FIG. 8 is a side elevational view, in section, showing the injector of FIG. 7.

As shown in FIG. 7 the injector 60 is symmetrical in plan view and has a small width at a front portion compared with a rear portion. The base portion 61 comprises a body 61a slightly tapered towards the front (about one degree), and a tapered portion 61c. At the front end of the tapered portion 61c, the narrow neck portion 62 is formed having three openings 64, one located on the upper surface and two located on the side surfaces is formed. The maximum width of the tapered portion 61c is larger than that of the tip portion 63.

As shown in FIG. 8, the bottom line of the tip portion 63, in section, extends substantially horizontally. The neck portion 62 has smaller height than the rear end of the tip portion 63 and than the front end of the body portion 61a. A seat 61b for securing the body 61a to the blade 58 and a recess 59a connected to the air-supply pipe 59 are formed on the base portion 61. A slightly tapered air passage 65 communicating with the air-supply pipe 59 is formed in the injector 60, communicating with the openings 64. The top opening 34 has a female thread so as to be closed with a screw cap as required. That is, the number of the openings may be varied as required depending on the area of each opening.

Figure 9:
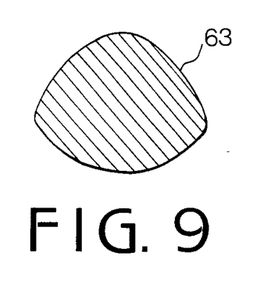
FIGS. 9 to 11 are sectional views showing sections of the injector along lines A—A, B—B and C—C of FIG. 8.
Figure 10:
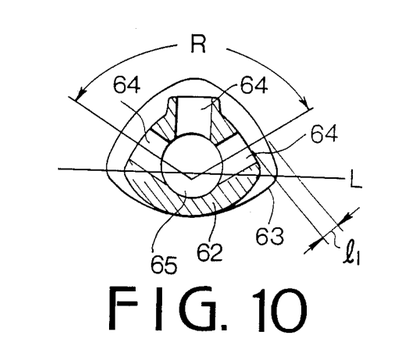
Figure 11:
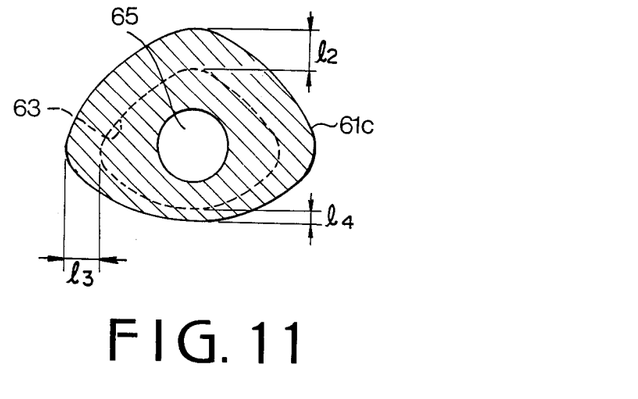
Figure 12:
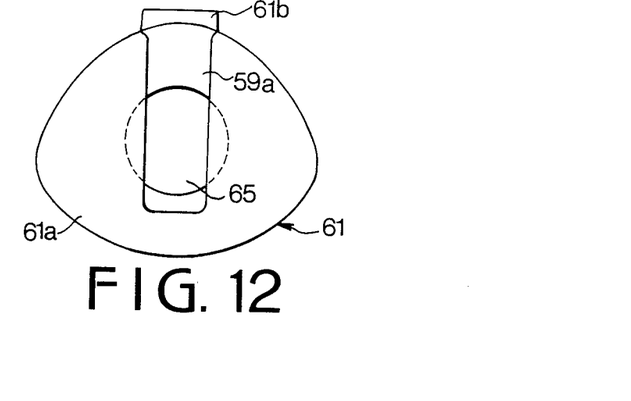
FIG. 12 is an elevational view of the injector as viewed from the direction Z of FIG. 8.
Figure 13:
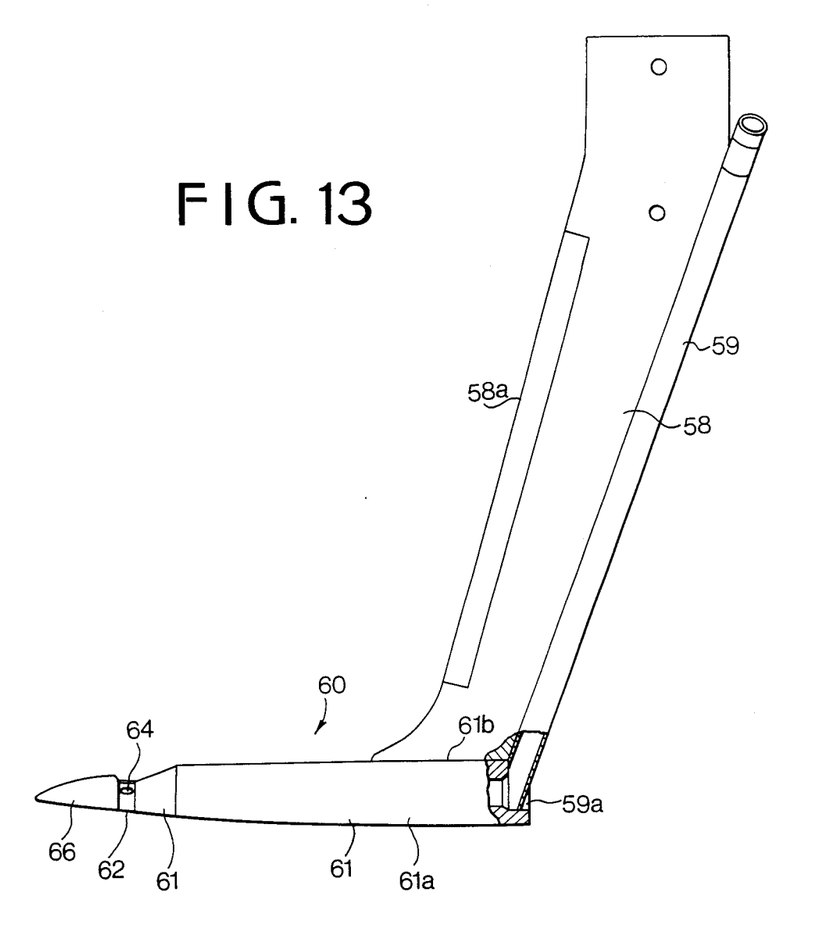
FIG. 13 is a side elevational view showing a blade and an injector of the second embodiment.
Figure 14:
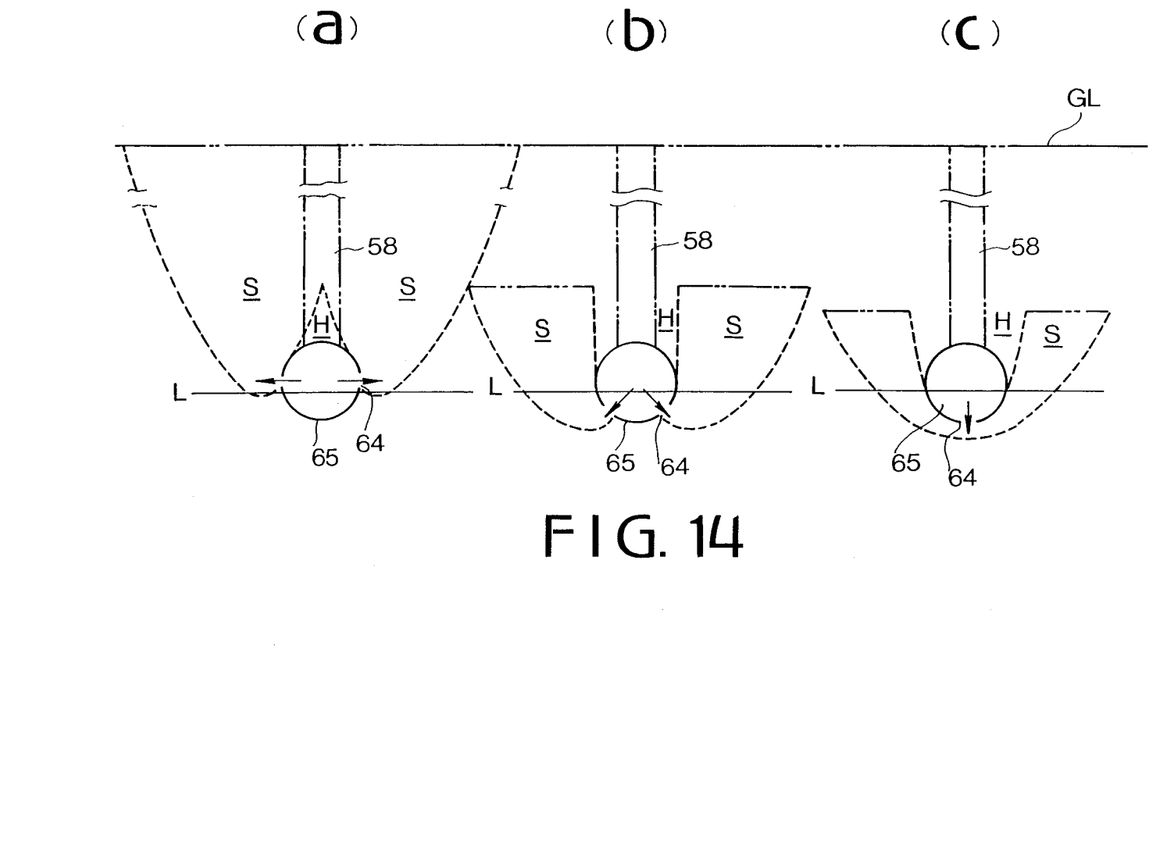
FIGS. 14a to 14c are schematic diagrams explaining the directions of injected air according to the positions of the openings

FIGS. 9 to 11 are sectional views along the lines A—A, B—B and C—C of FIG. 8. Each section of the base portion 61, neck portion 62 and the tip portion 63 has a shape triangular with slightly rounded sides, and its area increases in the order of the neck portion 62, tip portion 63, the base portion 61.

Referring to FIG. 10, one of the openings 64 is opened at the top of the passage 65a and the other two are opened to the left and to the right having an angle R of 120 degrees between them, each opening on the upper periphery of the neck portion 62. It is preferable to form the openings at positions above the line L which connects the two points on the periphery where the width is maximum.

The reason is explained in detail with reference to FIGS. 14a to 14c. FIGS. 14b and 14c show examples of the openings 64 formed below the line L. Compressed air is injected into the soil downwardly or in a slightly lateral direction. Therefore, the loosened area S in the ground will have low upper limit lines. The compressed air, is apt to quickly flow into the areas where the pressure of the soil is low. However, since the compressed air is injected downwardly into the areas where the pressure is higher than the area above the injector, the pulverizing power of the air is decreased at once, resulting in a small loosened area S. Therefore, the compressed air is not effectively used. In addition, the compressed air does not quite reach an area H above the injector 60 so that the area is not treated.

On the other hand, when the openings 64 are horizontally oriented from the passage 65 at positions above the line L, the compressed air acts to crack the soil at a great force so that the loosened area S is wider leaving only very small area H as shown in FIG. 14a. If the opening 64 is formed also at the top of the passage 65, the area H is diminished. The area H will be even smaller if the angle between the two side openings is smaller than 180 degrees, for example, 120 degrees as in the present embodiment. The preferable angle is in the range of 120 to 150 degrees.

Referring to FIGS. 7 to 10 and 11, the rear end of the tip portion 63 is higher than portion 62 by a difference $l_1$. The neck portion and the rear end of tapered portion 61c have a height difference $l_1$. There is a height difference $l_2$ and a width difference $l_3$ between the rear ends of the tip portion 63 and the tapered portion 61c. These differences are selected dependent on the position of the openings 64 so as to surround them. The difference $l_4$ between the rear ends of the tip portion 63 and the tapered portion 61c at the bottoms is smaller than the difference $l_2$ and the side difference $l_3$. Accordingly, the relationship among these differences $l_1$ to $l_4$ may be expressed bellow.

$$l_1' = l_1 + l_2$$

$$l_1 < l_1'$$

$$l_2 \approx l_3$$

$$l_4 < l_2$$

In accordance with this embodiment, the openings 64 are positioned at a forward location from the edge of the blade 58, for example by a distance 15–45 cm, and at a depth of 40–50 cm from the surface of the ground.

The operation of the cultivator 5 is described hereinafter. The cultivator 5 is supplied with power from the tractor 1 through the power take-off shaft 1a, propeller shaft 41 and the input shaft 38a of the compressor 38. One of sub-tanks 42a–42c is selected in accordance with the field conditions and the blade 58, the solenoid operated valves 48 and so forth are attached to the selected sub-tank. The sub-tanks that are not in use are covered with caps 45. The gauge wheel 55 rolls on the soil surface and the projection provided on the wheel 55 actuates the microswitch 56. Air is compressed by the compressor 38 and stored in the main tank 39. When the microswitch 56 is turned off, the valve 53 of the solenoid operated valve 48 is rotated to a position shown by the solid line of FIG. 6. Accordingly, the first port 50 and the second port 51 are communicated with each other, so that the compressed air flows out of the main tank 39 and is then stored in the sub-tank 42. When the microswitch 56 is turned on, the valve 53 is rotated to the position shown by the chain line thereby closing the first port 50 and communicating the second port 51 with the third port 52. Thus, compressed air in the sub-tank 42 is injected from the openings 64 so as to form cracks in the deep layers of the soil. By repeating such an operation, deep cultivate is achieved at certain intervals in the soil.

During the operation, most of the compressed air is forcefully injected into the soil in three directions, namely, upwardly in vertical direction, and slightly sideways to the right and left, and flows upwardly so that the soil above the injector 60 is cracked and hence loosened and aerated. A part of the compressed air tends to flow rearwardly along the injector 60 through the bore formed in the soil by the injector. However, since tapered portion 61c has a larger height compared with the tip portion 63, the bore formed by the tip portion 63 is blocked by the tapered portion to prevent the air from escaping rearwardly. A small quantity of the compressed air tends to flow out through the gap between the soil and the bottom edge of the injector 60. However, the bottom edge of the injector 60 slants downwardly and the tapered portion 61c is broadened by the difference $l_4$ so as to stop the flow of air. Therefore, the compressed air is completely blocked and effective deep cultivation can be achieved.

The injector 60 is formed symmetrical in plan view to decrease the yawing thereof. Furthermore, since the tip portion 63 has a downward tapered upper surface, thereby receiving a downward force on the upper surface, the upward heaving of the injector can be prevented. The bottom surface is shaped compared with the upper surface so as to receive a larger upward ground pressure thereby preventing the downward heaving which is caused by the reaction of the upwardly injected air.

In addition, the openings 64 are formed in the neck portion 62 at the rear of the tip portion 63 having the upper edge difference $l_1$ so that the openings 64 are not clogged by the soil while the injector advances. Further, since the openings are positioned at a forward location from the blade 58, the compressed air is prevented from escaping through a groove formed in the soil by the blade.

The depth of the blade 58 can be adjusted by vertically movable depth adjusting wheels 40. When the cultivator is at rest, it may be lifted by the three-point linkage 4 and supported by a pair of stands 66. The cultivator 5 may also be supported by the stands 66 and the depth adjusting wheels 40 without touching the blade 58 to the ground after being removed from the three-point linkage 4.

Figure 15:
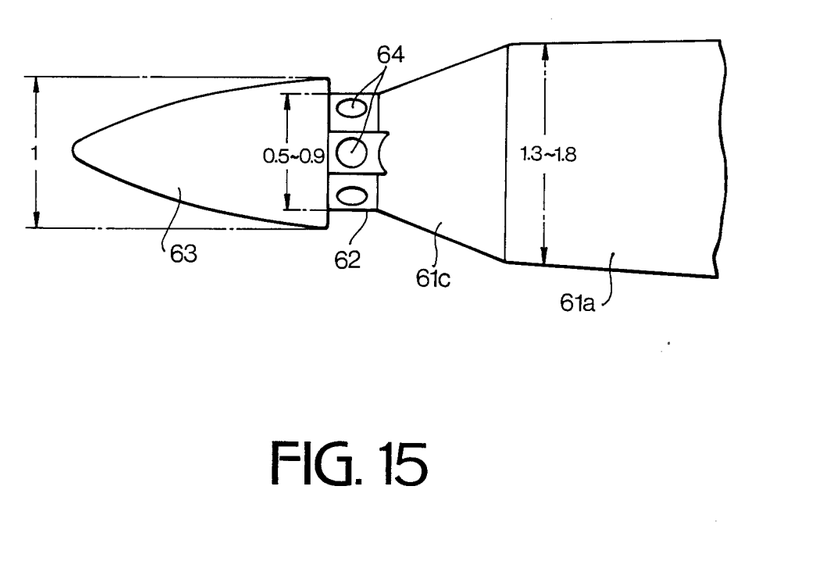
FIG. 15 is a schematic plan view of the invention showing the relationship between the length ratios.

As shown in FIG. 15 the radial length of the neck portion is about 0.5 to 0.9 times as large as the rear end of the tip portion and the radial length of the rear end of the tapered portion is about 1.3 to 1.8 times as large as the rear end of the tip portion. Such relationship insures the herein-described operation and advantages of the invention.

While the presently preferred embodiments of the present invention have been shown and described, it is to be understood that this disclosure is for the purpose of illustration and that various changes and modifications may be made without departing from the scope of the invention as set forth in the appended claims.

What is claimed is:
1. A cultivator comprising:
   a frame having a wheel for supporting the frame at a predetermined height;
   first means for connecting the frame to a tractor;
   at least one blade secured to the frame,
   the blade being downwardly projected from the frame and having an edge at the forward side thereof;
   an injector projected forwardly from a lower portion of the blade, the injector having a base portion comprising a body adjacent the blade and a tapered portion formed on the front end of the body, the tapered portion increasing in cross section with progression rearwardly along the body, a neck portion formed on the front end of the tapered portion and having at least one air injecting open- ing, a tip portion formed on the front end of the neck portion and having a surface which flares outward with increasing diameter towards a rear end of the tip portion, the neck portion having a smaller radial measure than that of the rear end of the tip portion, and said injecting opening being formed in the radially smaller neck portion, the front end of the tapered portion being positioned just adjacent to the periphery of the injecting opening and the rear end of the tapered portion being higher than the rear end of the tip portion, the body having a greater cross-sectional expanse than said tip portion and second means for supplying compressed air to the injection opening of the injector for injecting the compressed air into the soil.

2. The cultivator according to claim 1 wherein the second means comprises a compressor driven by a power take-off shaft of the tractor, an air tank, and a pipe communicating the air tank with the injector.

3. The cultivator according to claim 2 further comprising a valve provided in the pipe, and valve actuating means for intermittently opening the valve.

4. The cultivator according to claim 2 wherein the opening of injector lies on the upper peripheral face of said neck portion at an angle of between 0 and 90 degrees from the horizontal for injecting the compressed air in a lateral to upward directions.

5. The cultivator according to claim 1 wherein further comprising a rotary cultivating device provided behind the blade.

6. The cultivator according to claim 1 wherein
the neck portion has at least two injecting openings on the upper periphery thereof in a range between 120 and 150 degrees with said range centered on said upper periphery.

7. The cultivator according to claim 1, wherein
the radial length of the neck portion is about 0.5 to 0.9 times as large as the rear end of the tip portion and the radial length of the rear end of the tapered portions is about 1.3 to 1.8 times as large as the rear end of the tip portion.

8. A cultivator comprising:
a blade for cutting through soil to be cultivated;
a frame for carrying said blade, said frame including means for maintaining the lower end of said blade at a predetermined depth in the soil;
an injector appended to said lower end of said blade at least a portion of said injector projecting forward of said blade, said injector being formed with a cross-sectional dimension which varies in magnitude from a front end of said injector rearwardly toward said blade; and wherein said front end of said injector has a nose with a generally bullet-shaped outward flare increasing said dimension with progression rearwardly along said injector to a rear end of said nose;

rearward of said nose, said dimension decreases to define a neck of said injector;

rearward of said neck, said injector flares outward as a shoulder in a flared region increasing said dimension with progression rearwardly along said injector to a larger value than the value of the dimension at a rear end of said nose; said injector comprising an orifice for emission of compressed air to be injected into the soil, said orifice being located on a surface of said neck between said nose and said flared portion, said cultivator including means for introducing compressed air into said injector, whereby the rear end of said nose protects said orifice from entry of soil, and said shoulder compresses the soil behind said orifice to inhibit escape of compressed gas along said injector toward said blade, thereby to insure an expulsion of air in directions transverse to a longitudinal axis of said injector.

9. A cultivator according to claim 8, further comprising
a second orifice disposed in said neck alongside said first-mentioned orifice, the two orifices being angled relative to a vertical plane intercepting said longitudinal axis.

10. A cultivator according to claim 9 wherein
said orifices are oriented for directing air upward and outward.

11. A cultivator according to claim 8 wherein
said orifice points upward for directing air upwardly, said injector further comprising a second orifice and a third orifice which are angled about a longitudinal axis of said injector for expelling air laterally to both sides of said first-mentioned orifice.

12. The cultivator according to claim 1, wherein
the radial length of the neck portion is about 0.5 to 0.9 times as large as the rear end of the tip portion and the radial length of the rear end of the tapered portions is about 1.3 to 1.8 times as large as the rear end of the tip portion.

13. A cultivator according to claim 12 wherein
said air introducing means includes a conduit connecting with a rear portion of said injector and extending vertically along a rear edge of said blade.

14. A cultivator according to claim 13 wherein
said nose is formed with a downward tapered upper surface to prevent upward heaving of the injector.

* * * * *